June 13, 1944.  G. C. LITTLEFIELD  2,351,273
RUNWAY FOR AIRPORTS, AND THE LIKE, AND METHOD OF MAKING SAME
Filed Nov. 14, 1942
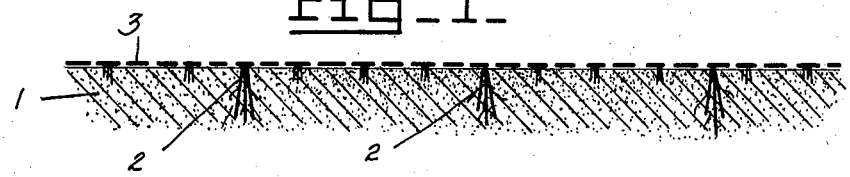
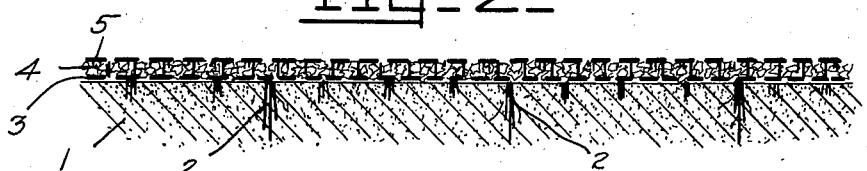
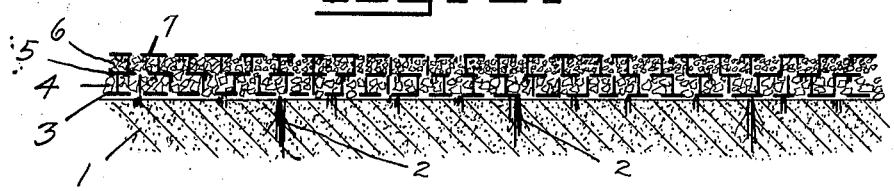
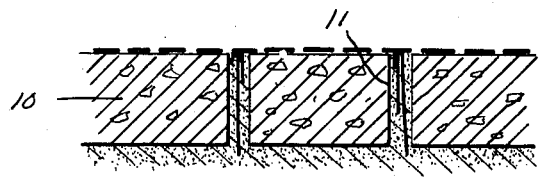 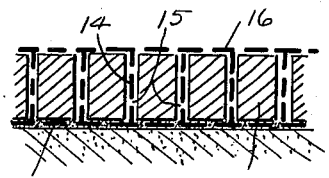
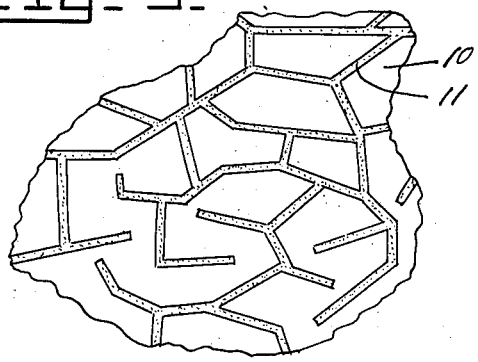
INVENTOR.
GLENN C. LITTLEFIELD
BY
*Boyken Mohler Beckley*
ATTORNEYS Patented June 13, 1944

2,351,273

UNITED STATES PATENT OFFICE 2,351,273

RUNWAY FOR AIRPORTS AND THE LIKE AND METHOD OF MAKING SAME

Glenn C. Littlefield, Monterey, Calif., assignor of one-half to Mary H. Littlefield and one-half to Joseph P. Mayo, both of Monterey, Calif.

Application November 14, 1942, Serial No. 465,582

8 Claims. (Cl. 94—2)

This invention relates to an improved runway for an air port or airplane landing field, and has for one of its objects a method of making a turf-covered runway or landing field that provides a relatively smooth, slightly cushioned landing surface that is durable, substantially impervious to detrimental erosion, softening or other impairment due to rain, melting snow, artificial sprinkling, etc., and which field when completed will blend with the surrounding green of grass or vegetation or which surrounding area may be readily made to blend with the runway or landing field to camouflage the latter without difficulty or prohibitive cost.

Another object is a solid, turf-covered runway or landing field, or the like, that is substantially impervious to erosion and softening by rain, melting snow or artificial sprinkling.

Other objects and advantages will appear in the annexed specification.

The invention hereinafter described more in detail, contemplates the use of a binder grass that propagates from runners and which will establish a thick, heavy turf. The preferred grass is Kikuyu grass (*Pennisetum clandistinum*), as this grass has been discovered to have the characteristics that most successfully accomplishes the desired result of surviving and attaining a vigorous growth under the conditions encountered in the practice of this invention, and which grass satisfactorily resists the severe abuse to which it is subjected on a runway and will grow in climatic and soil conditions where other grasses of a generally similar type will not. However, this invention is not restricted to the use of Kikuyu grass except where specifically defined in the claims, since other binder grasses such as St. Augustine (*Stenotaphrum secundatum*), Bermuda or St. Lucie may be employed where conditions are favorable to their growth. Kikuyu grass is more drought resistant, and a more rampant grower than the others, requiring less water, and grows well on any kind of soil, even poor, impoverished, stiff clay, or on heavy clay loam, gravel clay, red loam, sandy soils, alluvial vlei, etc., although it thrives best on moist vlei soil.

Kikuyu grass is a hardy, aggressive and persistent grower, having creeping characteristics. The growth of a single cutting or plant may cover an area of several square yards, and cuttings planted from say 6" to 4 feet apart will relatively quickly cover the area between cuttings with a dense, tough, relatively soft turf. Little water is required and the grass stays green all summer and winter where there is some water and where sub-freezing winter temperatures are not encountered.

As Kikuyu grass propagates by cuttings rather than by seed, it may readily be controlled or restricted to desired areas, thus being most suitable for use where fields surrounding air ports or runways are devoted to agricultural purposes.

While Kikuyu grass, and the other binder grasses having creeping characteristics may form a good, tough turf on soil, it has been found that a runway merely covered by such grasses, while satisfactory during a dry season, are not satisfactory in a wet season inasmuch as the soil becomes wet and soft, and the turf of runners and grass will not stand the landing weight of heavy airplanes. However, runways made in accordance with this invention are turf covered and solid under all conditions required for the safe and desired landing of heavy airplanes, and which runways are well drained, free from dust, and mud, and may be blended in appearance into surrounding fields. Also the runways of this invention will successfully resist the most severe wear and also will resist the tendency to show tracks that would indicate to hostile aerial observers in time of war the frequency of use of the runways. Furthermore, in the event of extremely severe use, the runways will quickly restore themselves by natural growth of the grass to their original condition should such use cause a slight change in the appearance or condition of the runways.

In the drawing,

Fig. 1 is a semi-diagrammatic, sectional fragmentary view illustrating the initial step in forming a runway in accordance with this invention.

Fig. 2 is a semi-diagrammatic, sectional view illustrating another step in the method.

Fig. 3 is a semi-diagrammatic, sectional view illustrating a further step in the development of a runway.

Fig. 4 is a semi-diagrammatic, sectional view illustrating a modification of the method of Figs. 1 to 3.

Fig. 5 is a fragmentary, reduced size plan view of the uncovered base that may be employed in the practice of the invention according to the method of Fig. 4.

Fig. 6 is a sectional, diagrammatic view of a further form of the invention.

In detail, the ground 1 (Fig. 1) for the runway is first leveled, with provision for drainage being made where necessary and desirable, as by slightly slanting the prepared surface. The prepared area is then planted with Kikuyu grass 2 or with some other binder grass that is propagated from runners and will establish a thick, heavy turf 3.

After such turf is established on the prepared soil, it is covered with a layer 4 of crushed rock (Fig. 2) to a depth of say about 3 inches, or a thickness that will not completely smother out the grass, and the rock particles should be relatively coarse or in pieces, say from about 1 inch to about 4 inches in thickness, thus leaving cracks sufficient to allow the runners to come to the surface where they expand by natural growth to cover the layer of rock and form a new turf 5.

After the above layer 4 of rock is laid, it may be rolled in order to settle the crushed rock layer into the turf 3 that has covered the surface of the ground.

After the second turf is formed over the layer 4, a second layer of crushed rock 6, in which the rock particles are preferably smaller in size than the rock of layer 4 is laid over turf 5, which layer must not be too thick to smother out the grass, and may be about two inches in thickness with the rock particles from one inch in thickness to about three inches in thickness. This layer 6 may be rolled in the same manner as layer 4, and successive layers of rock may thereafter be laid on the previously formed turf in the same manner as above described for the first two layers. The final layer may be of relatively fine rock and graded to the desired level.

By watering, the grass will readily come through the various layers to form a solid turf on the uppermost final layer, and the layers of rock will form a solid base as well as providing for excellent drainage, said top turf being designated 7.

It is obvious, of course, that the uppermost turf may, if desired, be covered with another layer of crushed rock at any time subsequent to the formation of the upper layer, or should unexpected settling of ground conditions or any unusual occurrence result in a pocket or depressions, such depressions may be filled by observing the steps hereinbefore described without removal of any portion of the previously laid layers of rock.

In Figs. 4, 5 is illustrated an alternative form of making a substantially solid runway, in which concrete 10 or cement or the like, is laid on previously prepared ground with suitable boards or forms being used to provide cracks 11 from the soil to the surface of the concrete after setting of the concrete and removal of the forms. Such cracks are preferably irregular in plan view (Fig. 5) so as to insure against long lines of weakness and regularity in appearance during growth. Cuttings planted in cracks of from 6 to 12 inches apart will readily grow and spread out over the concrete surfaces between cracks to provide a thick turf over the concrete and which contributes to binding the blocks of concrete in position if the latter are disconnected, although as shown in the lower portion of Fig. 5, the concrete may be connected at various points, such as indicated at 11 to form connections of concrete between blocks thereof as well as providing adequate cracks for the grass.

These cracks, of course, are preferably only from 6 to 36 inches apart so as to be inconsequential insofar as their effect on the tires of an airplane are concerned.

In both forms of the invention, the grass not only functions as a covering and camouflage for the runway, but also functions as a binder for the rock or concrete so that any possible injury to the runway by some unusual occurrence is substantially localized to the restricted area of the injury.

In Fig. 6 is shown a still further form of the invention slightly different from those of Figs. 1 to 5 in which a well established turf 12 covers the surface of the ground over the area of the desired runway.

Laid on the turf 12 are bricks 13 on edge that are in rows arranged in exactly the same manner as for a brick road. The turf may first be substantially well covered with a layer of sand as indicated, before laying the bricks if desired, although in some instances the bricks may be laid directly on the turf. The runners 14 then grow through cracks 15 and spread out over the top surfaces of the bricks to form a turf 16 over said bricks.

The use of the descriptive terms "runner forming binder grass" in the claims includes any stoloniferous strain of grass, and the term "rock-like material," covers such materials as brick, concrete, cement, and the like.

Having described my invention, I claim:

1. The method of making a turf-covered runway, landing field, or the like, that comprises the steps: substantially leveling the ground soil of the desired area for such runway; planting a runner forming, binder grass in said leveled soil at a plurality of points distributed throughout said area and spaced from each other such distances as are within the capacity of the grass runners to cover the soil in said area with turf; spreading a substantially uniform layer of rock particles over the turf covering said area after said turf is formed; permitting the runners from said turf and grass to grow through said layer of rock and thereover until a second turf is formed over said layer whereby a double layer of turf is formed above said ground with a uniform layer of rock therebetween.

2. The method of making a turf-covered runway, landing field, or the like, that comprises the steps: substantially leveling the ground soil of the desired area for such runway; planting a runner forming, binder grass in said leveled soil at a plurality of points distributed throughout said area and spaced from each other such distances as are within the capacity of the grass runners to cover the soil in said area with a relatively thick turf; spreading a substantially uniform layer of rock particles over the turf covering said area after said turf is formed; permitting the runners from said turf and grass to grow through said layer of rock and thereover until a second turf is formed over said layer; thereafter repeating the aforesaid steps of spreading rock particles over the turf and permitting the coverage thereof by turf produced from the turf below such layer, until the alternate layers of rock and turf are of the desired thickness.

3. The method of making a turf-covered runway, landing field, or the like, that comprises the steps: substantially leveling the ground soil of the desired area for such runway; planting a runner forming, binder grass in said leveled soil at a plurality of points distributed throughout said area and spaced from each other such distances as are within the capacity of the grass runners to cover the soil in said area with a relatively thick turf; spreading a substantially uniform layer of rock particles over the turf covering said area after said turf is formed and rolling said layer down against said turf so as to compact said layer and to force particles thereof between the runners of said turf to said soil; permitting runners from said turf to grow through interstices between particles of said layer to above the latter and to spread over said layer thereby forming a second turf above and over the latter.

4. The method of making a turf-covered runway, landing field, or the like, that comprises the steps: substantially leveling the ground soil of the desired area for such runway; planting a runner forming, binder grass in said leveled soil at a plurality of points distributed throughout said area and spaced from each other such distances as are within the capacity of the grass runners to cover the soil in said area with a relatively thick turf; spreading a substantially uniform layer of rock particles over the turf covering said area after said turf is formed and rolling said layer down against said turf so as to compact said layer and to force particles thereof into said turf; permitting runners from said turf to grow through interstices between particles of said layer to above the latter and to spread over said layer for forming a second turf covering the latter; spreading a second layer of rock particles of sizes smaller than the particles of the first mentioned layer over said second turf and rolling said second layer down against said second turf so as to compact said layer and to force particles thereof into said second turf; thereafter permitting runners from said turf to grow through interstices between particles of said layer to above the latter and to spread over said second layer for forming a third turf covering said second layer.

5. The method of making a turf covered runway, landing field, or the like, that comprises the steps: substantially leveling the ground soil of the desired area for such runway; planting a runnner forming, binder grass in said leveled soil at a plurality of points distributed throughout said area and spaced from each other such distances as are within the capacity of the grass runners to cover the soil in said area with a relatively thick turf; spreading a substantially uniform layer of rock particles of generally uniform size over the turf covering said area after said turf is formed and rolling said layer down against said turf; permitting runners from said turf to grow through interstices between particles of said layer to above and over the said layer until a second turf is formed over said layer; thereafter repeating the steps of spreading rock particles over the turf formed therebelow and over the preceding layer in which each layer that is successively spread comprises finer particles of rock than the preceding layer whereby a plurality of turfs will be formed, each adjacent pair of which is separated by a layer of rock particles with the uppermost layer supporting the turf of the runway or landing field.

6. The method of covering a dirt runway or landing field with turf that comprises planting said runway with grass from one of the group: Kikuyu, St. Augustine, St. Lucie; and after the natural growth thereof forms a turf covering the runway, spreading a series of layers of rock particles thereover at time intervals sufficient to permit the grass runners from the grass planted in the soil of the runway to form a turf over the rock particles of each layer.

7. A runway or landing field planted with a runner forming, binder grass and covered with a plurality of layers of crushed rock, and a turf from said binder grass disposed between each pair of adjacent layers of rock and over the uppermost of said layers; said turfs being connected by runners thereof with each other and with the rooted plants for maintaining growth in the turf covering the uppermost layer and for binding the rock particles of said layers together.

8. The method of making a turf covered runway, landing field, or the like, that comprises the steps; substantially leveling the soil of the desired area for such runway; planting a stoloniferous strain of grass in said leveled soil at a plurality of points distributed throughout said area and spaced from each other at such distances as are within the capacity of runners from such grass to cover the soil in said area with a turf; covering said turf with spaced bodies of rock-like material, and thereafter permitting the runners of said grass to grow through the spaces between said bodies and to cover said bodies in interlacing relationship thereby forming a turf over said bodies.

GLENN C. LITTLEFIELD.